United States Patent
North et al.

(10) Patent No.: US 9,891,677 B2
(45) Date of Patent: Feb. 13, 2018

(54) SKIN BASED SYSTEM COOLING USING INTERNAL SYSTEM FAN

(71) Applicant: Dell Products L.P., Round Rock, TX (US)

(72) Inventors: Travis C. North, Cedar Park, TX (US); Christopher M. Helberg, Austin, TX (US); Austin M. Shelnutt, Leander, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 119 days.

(21) Appl. No.: 14/483,470

(22) Filed: Sep. 11, 2014

(65) Prior Publication Data

US 2016/0077557 A1 Mar. 17, 2016

(51) Int. Cl.
*G06F 1/20* (2006.01)

(52) U.S. Cl.
CPC .................... *G06F 1/203* (2013.01)

(58) Field of Classification Search
CPC  H05K 7/20–7/2099; G06F 1/20–1/203; G06F 2200/201–2200/203
See application file for complete search history.

(56) References Cited

U.S. PATENT DOCUMENTS

| | | | | |
|---|---|---|---|---|
| 4,932,610 A * | 6/1990 | Maestrello | ............ | B64C 21/00 114/67 A |
| 5,313,362 A * | 5/1994 | Hatada | ............ | G06F 1/203 165/80.3 |
| 6,588,497 B1 * | 7/2003 | Glezer | ............ | F15D 1/009 165/84 |
| 7,288,895 B2 * | 10/2007 | Rossi | ............ | G06F 1/20 315/112 |
| 7,760,506 B1 * | 7/2010 | Wang | ............ | H05K 7/20727 361/679.48 |
| 7,990,705 B2 * | 8/2011 | Bult | ............ | F15D 1/08 165/80.2 |
| 8,235,309 B2 * | 8/2012 | Xu | ............ | B64C 21/04 239/102.1 |
| 9,123,698 B2 * | 9/2015 | Bhagavat | ............ | H01L 23/467 |
| 2004/0042176 A1 * | 3/2004 | Niwatsukino | ....... | F28D 15/0266 361/699 |
| 2004/0250562 A1 * | 12/2004 | Adiga | ............ | F28D 5/00 62/259.2 |
| 2005/0117298 A1 * | 6/2005 | Koga | ............ | G06F 1/203 361/699 |
| 2006/0022092 A1 * | 2/2006 | Miller | ............ | B64C 21/02 244/200.1 |
| 2006/0198104 A1 * | 9/2006 | Chang | ............ | H05K 7/20145 361/695 |
| 2006/0245163 A1 * | 11/2006 | Mukasa | ............ | G06F 1/20 361/701 |

(Continued)

*Primary Examiner* — David M Sinclair
*Assistant Examiner* — Robert Brown
(74) *Attorney, Agent, or Firm* — Terrile, Cannatti, Chambers & Holland, LLP; Stephen A. Terrile

(57) ABSTRACT

A system and method for improving the cooling of the skin of an information handling system. More specifically, in certain embodiments, the information handling system comprises an air moving device positioned to generate boundary layer disruption on the external skin of the system. In certain embodiments the air moving device is located within the information handling system.

6 Claims, 5 Drawing Sheets

(56) References Cited

U.S. PATENT DOCUMENTS

| | | | | |
|---|---|---|---|---|
| 2006/0281398 A1* | 12/2006 | Yokomizo | G06F 1/203 | 454/184 |
| 2007/0002534 A1* | 1/2007 | Mongia | H01L 23/467 | 361/689 |
| 2007/0023169 A1* | 2/2007 | Mahalingam | F25D 17/02 | 165/104.28 |
| 2007/0127210 A1* | 6/2007 | Mahalingam | G06F 1/20 | 361/700 |
| 2007/0141453 A1* | 6/2007 | Mahalingam | H01M 10/42 | 429/120 |
| 2007/0172726 A1* | 7/2007 | Miller | H01M 2/0277 | 429/142 |
| 2008/0186678 A1* | 8/2008 | North | G06F 1/20 | 361/700 |
| 2008/0259566 A1* | 10/2008 | Fried | F28D 15/0266 | 361/699 |
| 2009/0080157 A1* | 3/2009 | Varadarajan | G06F 1/203 | 361/697 |
| 2009/0294106 A1* | 12/2009 | Flotta | H01L 23/4735 | 165/104.33 |
| 2010/0039012 A1* | 2/2010 | Grimm | F21K 9/00 | 313/35 |
| 2010/0096111 A1* | 4/2010 | Kucherov | F28F 3/04 | 165/109.1 |
| 2010/0214734 A1* | 8/2010 | Cho | G06F 1/20 | 361/679.46 |
| 2011/0089804 A1* | 4/2011 | Mahalingam | F21K 9/135 | 313/46 |
| 2011/0103011 A1* | 5/2011 | Koplow | F04D 25/0606 | 361/679.54 |
| 2011/0114287 A1* | 5/2011 | Arik | H05K 7/20172 | 165/67 |
| 2012/0090825 A1* | 4/2012 | Yarin | C25D 7/00 | 165/185 |
| 2012/0298769 A1* | 11/2012 | Heffington | B64C 23/04 | 239/102.1 |
| 2013/0155680 A1* | 6/2013 | Grimm | F21V 29/63 | 362/249.02 |
| 2014/0002990 A1* | 1/2014 | Sharma | F21V 29/74 | 361/694 |
| 2014/0034270 A1* | 2/2014 | de Bock | H05K 7/20172 | 165/80.3 |
| 2014/0049970 A1* | 2/2014 | de Bock | H01L 41/0926 | 362/373 |
| 2014/0240921 A1* | 8/2014 | Sultenfuss | G06F 1/1656 | 361/679.54 |
| 2014/0268545 A1* | 9/2014 | Mahalingam | G06F 1/203 | 361/679.47 |
| 2014/0271277 A1* | 9/2014 | Whalen | F04B 43/046 | 417/413.2 |

* cited by examiner

General Isotherms (wireless charging)

- 10W case shown
- Hot spots at SOC, WWAN module and RX coil locations
- WUXGA controller and BL are significant heat sources

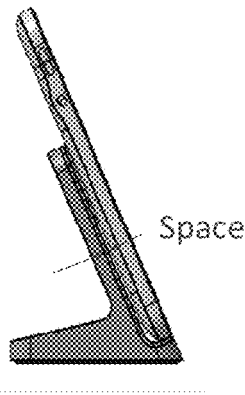
*Figure 7A*
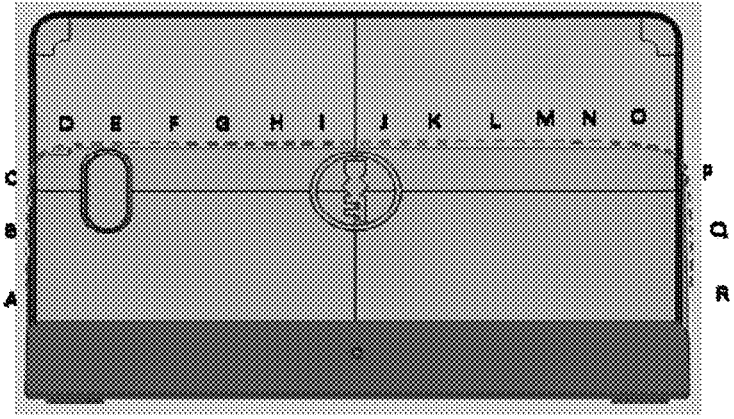
*Figure 7b*
2mm
| RP | V | A | B | C | D | E | F | G | H | I | J | K | L | M | N | O | P | Q | R |
|---|---|---|---|---|---|---|---|---|---|---|---|---|---|---|---|---|---|---|---|
| 4500 | 3.0 | 0.34 | 0.35 | 0.10 | 0.39 | 1.35 | 1.41 | 1.43 | 1.46 | 1.48 | 1.77 | 1.20 | 0.90 | 0.61 | 0.10 | 0.00 | 0.00 | 0.07 | 0.31 |
| 5000 | 3.5 | 0.44 | 0.46 | 0.13 | 0.60 | 1.46 | 1.51 | 1.56 | 1.75 | 1.64 | 1.98 | 1.49 | 1.18 | 0.86 | 0.14 | 0.06 | 0.00 | 0.11 | 0.29 |
| 5500 | 3.9 | 0.38 | 0.35 | 0.20 | 0.58 | 1.60 | 1.58 | 1.62 | 1.82 | 1.85 | 1.85 | 2.17 | 1.57 | 1.32 | 0.94 | 0.06 | 0.00 | 0.11 | 0.31 |
1.5mm
| RP | (V) | A | B | C | D | E | F | G | H | I | J | K | L | M | N | O | P | Q | R |
|---|---|---|---|---|---|---|---|---|---|---|---|---|---|---|---|---|---|---|---|
| 3500 | 2.3 | 0.34 | 0.96 | 0.94 | 0.00 | 0.00 | 0.55 | 0.58 | 1.06 | 1.20 | 1.18 | 1.10 | 0.43 | 0.25 | 0.00 | 0.00 | 0.13 | 0.36 | 0.16 |
| 4000 | 2.6 | 0.50 | 1.23 | 1.13 | 0.00 | 0.00 | 0.59 | 0.89 | 1.35 | 1.73 | 1.50 | 1.33 | 0.65 | 0.26 | 0.00 | 0.00 | 0.14 | 0.38 | 0.20 |
| 4500 | 3.0 | 0.66 | 1.33 | 1.29 | 0.00 | 0.00 | 0.76 | 0.94 | 1.42 | 1.90 | 1.50 | 1.38 | 0.66 | 0.27 | 0.00 | 0.00 | 0.15 | 0.40 | 0.21 |
| 5000 | 3.5 | 0.77 | 1.52 | 1.45 | 0.00 | 0.00 | 1.00 | 1.33 | 1.52 | 2.34 | 2.10 | 1.70 | 0.70 | 0.29 | 0.00 | 0.00 | 0.21 | 0.46 | 0.24 |
| 5500 | 3.9 | 0.85 | 1.68 | 1.53 | 0.00 | 0.00 | 1.15 | 1.45 | 1.68 | 2.53 | 2.20 | 1.79 | 0.81 | 0.35 | 0.00 | 0.00 | 0.22 | 0.48 | 0.25 |
*Figure 8*

SKIN BASED SYSTEM COOLING USING INTERNAL SYSTEM FAN

BACKGROUND OF THE INVENTION

Field of the Invention

The present invention relates to information handling systems. More specifically, embodiments of the invention relate to a skin based information handling system cooling using an internal system fan.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue that relates to information handling systems, particularly mobile type information handling systems is how to best cool the information handling system. As information handling system trends continue to move toward thinner, lighter, and more powerful systems, there is a need to maximize performance while minimizing form factor. As systems continue to trend thinner and lighter, critical cooling aspects of the system have transitioned from individual components such as system on chip or memory to the system skin becoming a limiting cooling factor. For example, with one known mobile information handling system the component cooler capacity of the system supports up to 53.5 W cooling capacity while the system skin is only capable of supporting 44 W cooling capacity. Accordingly, in this example system, it is necessary to throttle system performance to keep the system within the 44 W target.

The issue of how to best cool the skin may also be more prevalent at certain locations of the system compared to other locations of the system or may be more prevalent when the system is performing certain operations compared to other operations. For example, FIG. 1, labeled Prior Art, shows an example of temperature distribution when a system is under processor stress as well as when a system is performing a graphics test. This issue of how to best cool the skin of the system is also present due to the advent of wireless charging and a move toward high power communication devices. For example, FIG. 2, labeled Prior Art, shows an example of general isotherms of a system when wireless charging is being performed.

Accordingly, it would be desirable to provide a way to improve cooling of the skin while minimizing the form factor of the system.

SUMMARY OF THE INVENTION

A system and method are disclosed for improving the cooling of the skin of an information handling system. More specifically, in certain embodiments, the information handling system comprises an air moving device positioned to generate boundary layer disruption on the external skin of the system. In certain embodiments the air moving device is located within the information handling system.

More specifically, in certain embodiments, the air moving device comprises at least one jet cooling air moving device which is positioned to generate a high velocity low pressure air flow across the skin of the system. In certain embodiments, the jet cooling air moving device is packaged in parallel with mother board allowing for unused spaced to become thermally useful. Additionally, in certain embodiments, the jet cooling air moving device has a height dimension of less than 3 mm. By so positioning the jet cooling air moving device a jet of airflow is generated along the outer surface of the system thereby disrupting the thermal boundary layer and improving cooling performance.

Additionally, in certain embodiments, the skin of the system further includes a micro porous material which allows the jet cooling air moving device to generate pressure oscillations which disrupt the boundary layers external skin boundary layers from an internal air moving device. Additionally, in certain embodiments, the system further includes a synthetic jet and port hole to facilitate development of jet flow along the external skin.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 7A and 7B show diagrammatic representations of an air flow calculation set up.

FIG. 8 shows a matrix of measurements of air flow calculations.

DETAILED DESCRIPTION

Figure 1:
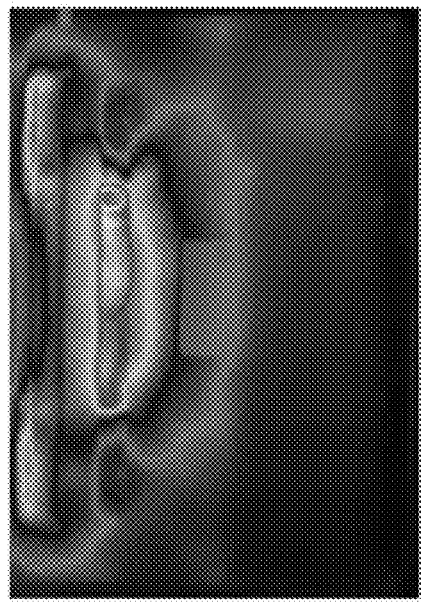
FIG. 1, labeled Prior Art, shows an example of temperature distribution when a system is under processor stress as well as when a system is performing a graphics test.
Figure 1:
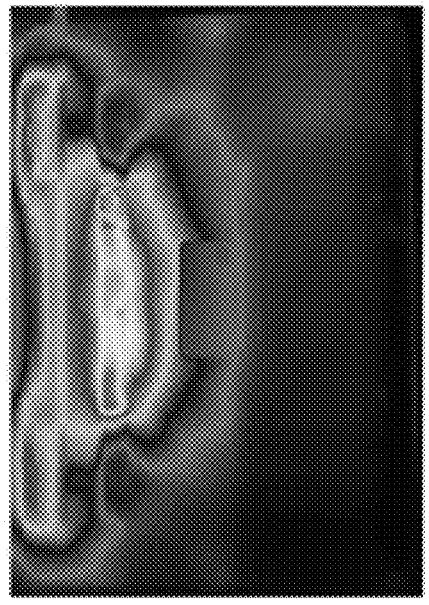
Figure 1:
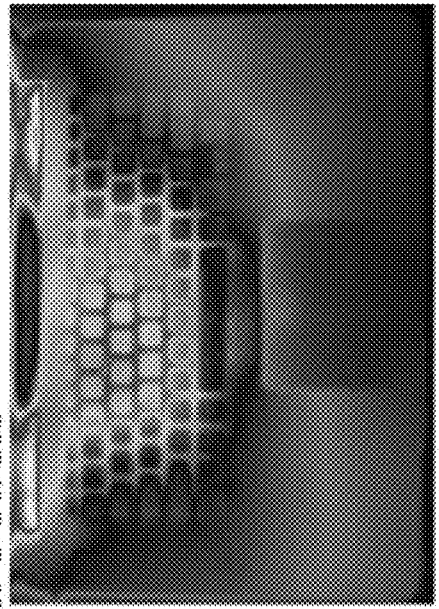
Figure 1:
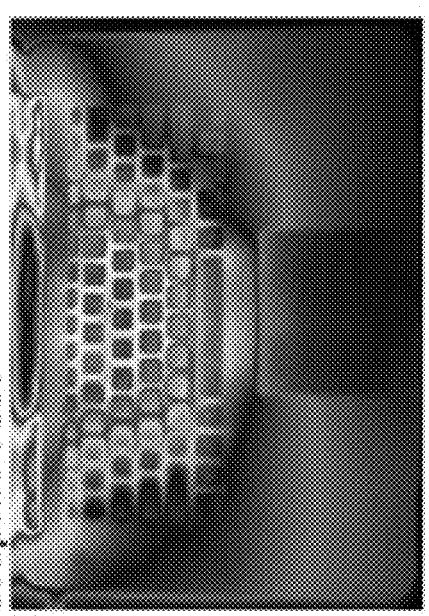
Figure 2:
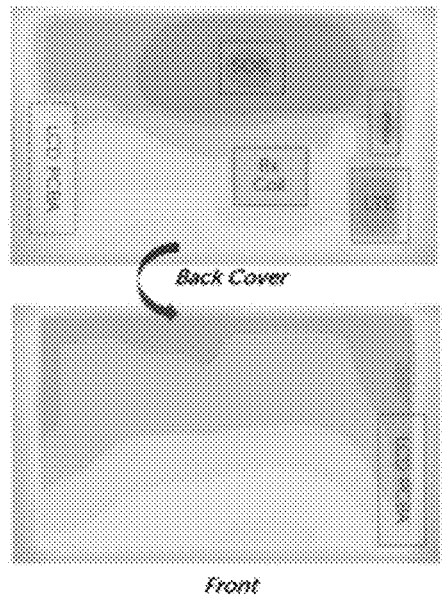
FIG. 2, labeled Prior Art, shows an example of general isotherms of a system when wireless charging is being performed.
Figure 3:
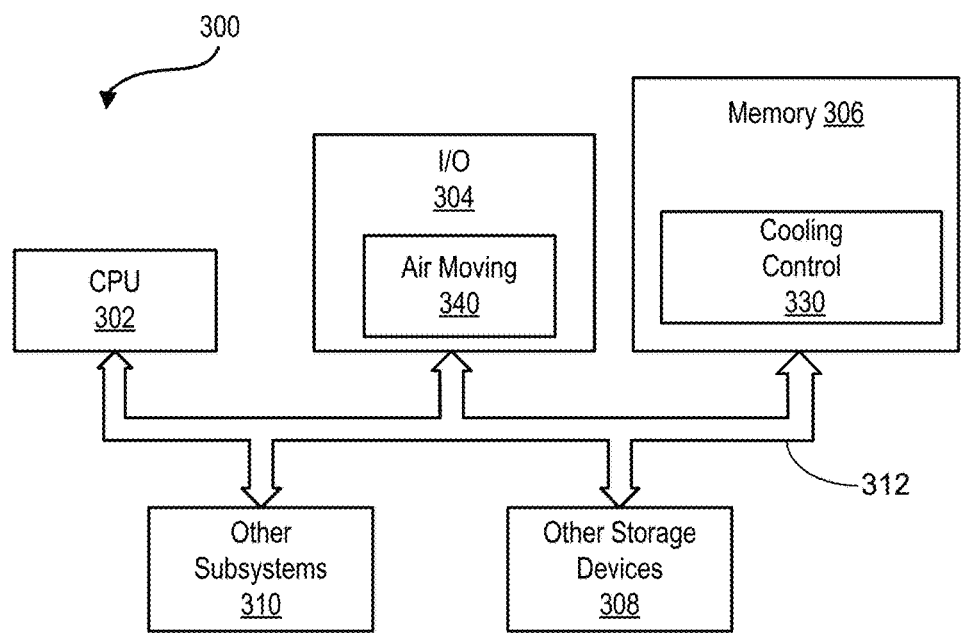
FIG. 3 shows a general illustration of components of an information handling system as implemented in the system and method of the present invention.

FIG. 3 is a generalized illustration of an information handling system 300 that can be used to implement the system and method of the present invention. The information handling system 300 includes a processor (e.g., central processor unit or "CPU") 302, input/output (I/O) devices 304, such as a display, a keyboard, a mouse, and associated controllers, memory 306, and various other subsystems 308. The information handling system 300 likewise includes other storage devices 310. The components of the information handling system are interconnected via one or more buses 312.

In certain embodiments, the system 300 further includes a cooling control system 330 stored in the memory 306 which includes instructions executable by the processor 302. Also, in certain embodiments the system further includes at least one air moving device 340. The air moving device 340 improves cooling of the skin (i.e., the external surface of the housing) of an information handling system 300.

Figure 4:
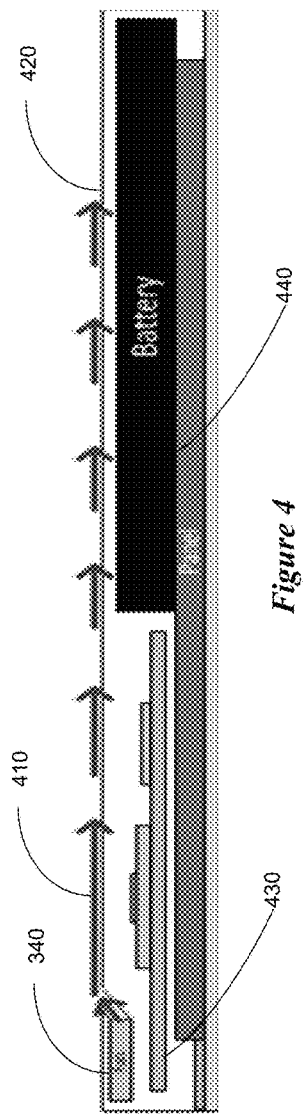
FIG. 4 shows a diagrammatic representation of an air moving device positioned to generate boundary layer disruption on the external skin of an information handling system.

Referring to FIG. 4, a diagrammatic representation of an air moving device 340 within an information handling system 300 is shown. The air moving device 340 is positioned to generate a boundary layer disruption 410 on the external skin 420 of an information handling system is shown. The air moving device 340 improves cooling of the skin 420 (i.e., the external surface of the housing) of an information handling system 300. In certain embodiments, the air moving device 340 is positioned to generate boundary layer disruption on the external skin of the system. Also, in certain embodiments the air moving device 340 is located within the information handling system 300.

In certain embodiments, the air moving device 340 comprises at least one jet cooling air moving device which is positioned to generate a high velocity low pressure air flow across the skin of the system. A jet cooling device utilizes high velocity airflow to entrain air into the bulk air stream creating greater flow than what exits the jet exhaust directly. Typical jet airflows can approach 5 m/s but other embodiments can go beyond 8 m/s. The usefulness of the jet cooling device is that such a device allows for packaging an air mover at smaller system thickness (sub 4 mm in the Z direction) allowing for previous unused volume to be used for an air moving device. In certain embodiments, the jet cooling air moving device is packaged in parallel with the mother board 430 of the information handling system 300 thus allowing for unused spaced to become thermally useful. Additionally, in certain embodiments, the jet cooling air moving device 340 is positioned on the side of the information handling system 300 corresponding to the position of the battery 440.

Additionally, in certain embodiments, the jet cooling air moving device has a height dimension of less than 3 mm. By so positioning the jet cooling air moving device a jet of airflow is generated along the outer surface of the system thereby disrupting the thermal boundary layer and improving cooling performance. Additionally, in certain embodiments, the skin of the system further includes a micro porous material which allows the jet cooling air moving device to generate pressure oscillations which disrupt the boundary layers external skin boundary layers from an internal air moving device. A microporous material is defined as a material that has a pore diameter of as small as 2 nm (however, in certain embodiments, the pore diameter can be as large as 0.5 mm). Another way to think of this is a material that has a very small hole diameter that is difficult to see while allowing airflow through the material. This type of material is useful as it provides the form of a uniform surface while providing a cooling mechanism via airflow through the surface. Additionally, in certain embodiments, the system further includes a synthetic jet and port hole to facilitate development of jet flow along the external skin.

Figure 5:
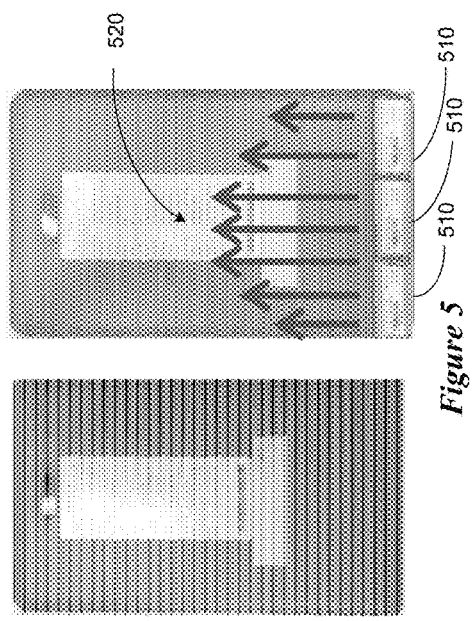
FIG. 5 shows a diagrammatic representation of a synthetic jet based air moving device.

FIG. 5 shows a diagrammatic representation of a synthetic jet based air moving device. More specifically, using jet based air movers 510, a wall of jet flow (represented by arrows 520) is developed. This wall of jet flow provides similar performance to that of a HVAC diffuser. More specifically, this jet flow is similar to that of an HVAC diffuser in which the airstream generated is delivered along the ceiling of a building spreading the supply air over the ceiling of the building. In the present invention, the jet of airflow that is generated internal to the device is delivered over the surface of the system. In both cases the surface is cooled directly by a stream of airflow and the port hole of the system provides a similar functionality as that of a HVAC diffuser.

Figure 6:
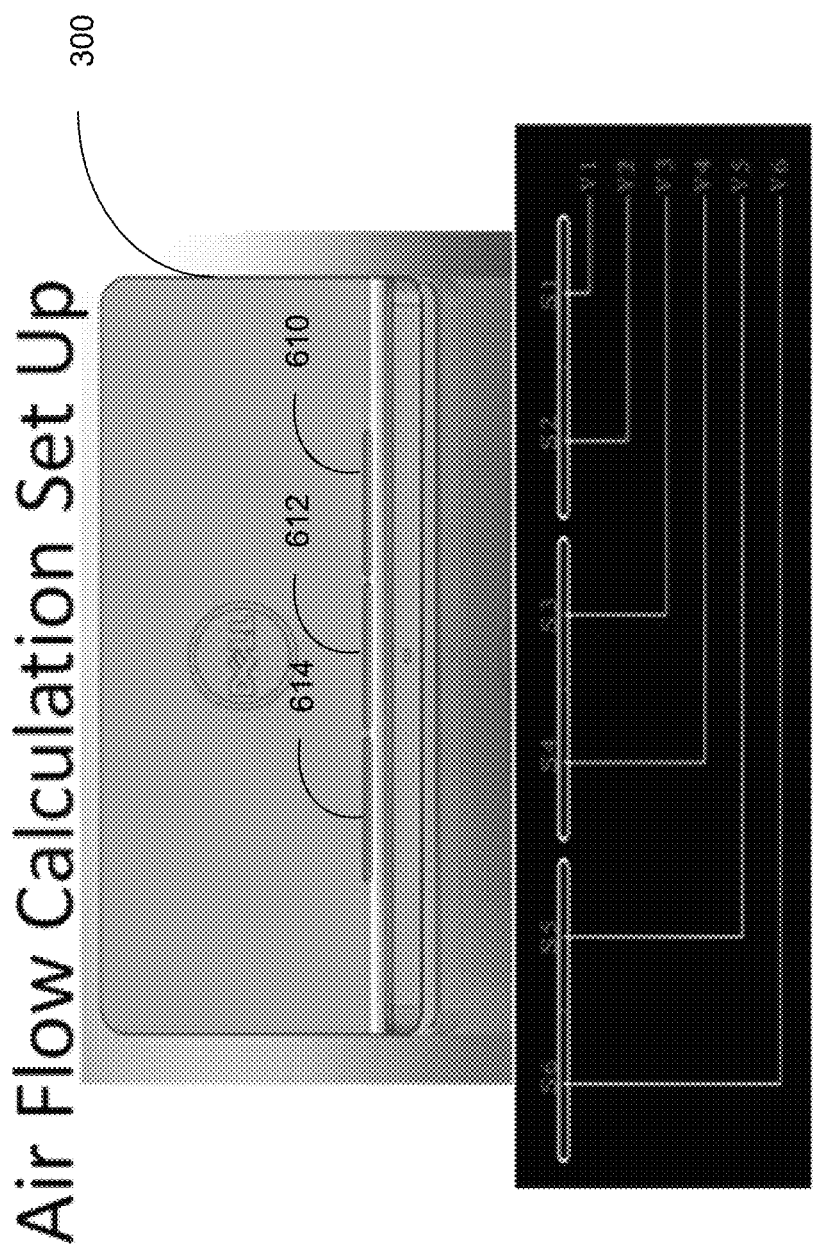
FIG. 6 shows a diagrammatic representation of an air flow calculation set up.

FIG. 6 shows a diagrammatic representation of an air flow calculation set up. More specifically, in one embodiment, the information handing system 300 includes three synthetic jet and port holes 610, 612, 614 to facilitate development of jet flow along the external skin of the information handling system 300. Each port hole is further identified by S1-S6 with local velocities V1-V6 measured at the exhaust of the port holee. For example, recent testing of an example system utilizing an external air moving device measured velocities of 2.15 m/s, s.24 m/s, 2.65 m/s, s.6 m/s, s.45 m/s and 2.2 m/s, respectively. This localized velocity allowed for a total system level airflow of 0.5 CFM which illustrated a 10 C drop cooling of localized hot spots.

FIGS. 7A and 7B shows a diagrammatic representation of an air flow calculation set up. More specifically, in one embodiment, the information handing system includes a plurality of synthetic jet and port holes to facilitate development of jet flow along the external skin of the information handling system. For example, recent testing of an example system utilizing an external air moving device at 0.5 CFM illustrated a 10 C drop in hot spot temperature.

FIG. 8 shows a localized matrix of velocity measurements along a back surface of the system shown in FIGS. 7A and 7B. The matrix includes velocity measurements for spaces of 1.5 mm and 2 mm. Using the points identified by letters in FIG. 7B, this localized matrix represents measurements that were made at hot spot locations to determine an amount of air flowing across the hot spot locations. It can be seen from the information contained in the localized matrix that at high system air mover speeds, the system achieved over 2 m/s in localized velocities. By positioning the jets according to the hot spot locations the system significantly improves local heat transfer coefficients for the hot spots.

Based upon the data, it will be appreciated that in certain embodiments it is desirable to position the air moving device at the right side of the 10 W coil to allow maximum air flow across the heated area. It will also be appreciated that it is desirable to reduce the speed of the fan because the higher the speed of the fan, the louder the noise produced by the fan.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A method for cooling a system comprising:
   positioning an air moving device within the system, the system comprising a mother board, a panel and a battery, the mother board, the panel and the battery being contained within a housing, the battery being positioned between the panel and a side of the housing opposite the panel; and,
   generating a boundary layer disruption via the air moving device, the boundary layer disruption being generated by moving a jet of airflow along an outer surface of the system, the jet of airflow disrupting a thermal boundary layer affecting an external skin of the system corresponding to the side of the housing opposite the panel; and wherein
   the air moving device comprises at least one jet cooling air moving device, the jet cooling air moving device being positioned to generate a high velocity low pressure air flow across the external skin of the system; and wherein,
   the jet cooling air moving device is positioned in parallel with a mother board of the system; and,
   the housing comprises a plurality of a synthetic jet and port holes to facilitate development of jet flow along the external skin positioned on the side of the housing corresponding to the battery.

2. The method of claim 1, wherein:
   the system comprises a micro porous material, the micro porous material allowing the air moving device to generate pressure oscillations which disrupt boundary layers of an external skin boundary layers from an internal air moving device.

3. A system comprising:
   a processor;
   a data bus coupled to the processor;
   a mother board;
   a battery;
   a housing, the mother board, the panel and the battery being contained within the housing, the battery being positioned between the panel and a side of the housing opposite the panel;
   an air moving device, the air moving device being configured to generate a boundary layer disruption via the air moving device, the boundary layer disruption being generated to affect an external skin of the system corresponding to the side of the housing opposite the panel; and wherein
   the air moving device comprises at least one jet cooling air moving device, the jet cooling air moving device being positioned to generate a high velocity low pressure air flow across the external skin of the system; and wherein,
   the jet cooling air moving device is positioned within the housing in parallel with the mother board of the system; and,
   the housing comprises a plurality of a synthetic jet and port holes to facilitate development of jet flow along the external skin positioned on the side of the housing opposite the panel.

4. The system of claim 3, wherein:
   the system comprises a micro porous material, the micro porous material allowing the air moving device to generate pressure oscillations which disrupt boundary layers of an external skin boundary layers from an internal air moving device.

5. The method of claim 1, wherein:
   the air moving device comprises a plurality of jet cooling air moving devices located within the system, the plurality of jet cooling air moving devices being positioned to generate a wall of jet flow, the wall of jet flow providing the high velocity low pressure air flow across the skin of the system.

6. The system of claim 3, wherein:
   the air moving device comprises a plurality of jet cooling air moving devices located within the system, the plurality of jet cooling air moving devices being positioned to generate a wall of jet flow, the wall of jet flow providing the high velocity low pressure air flow across the skin of the system.

* * * * *